(12) United States Patent
Nishikawa et al.

(10) Patent No.: US 11,663,737 B2
(45) Date of Patent: May 30, 2023

(54) INFORMATION PROCESSING APPARATUS AND REPRESENTATIVE COORDINATE DERIVATION METHOD

(71) Applicant: Sony Interactive Entertainment Inc., Tokyo (JP)

(72) Inventors: Kenzo Nishikawa, Tokyo (JP); Takanori Minamino, Kanagawa (JP)

(73) Assignee: SONY INTERACTIVE ENTERTAINMENT INC., Tokyo (JP)

(*) Notice: Subject to any disclaimer, the term of this patent is extended or adjusted under 35 U.S.C. 154(b) by 403 days.

(21) Appl. No.: 16/850,339

(22) Filed: Apr. 16, 2020

(65) Prior Publication Data

US 2020/0342624 A1 Oct. 29, 2020

(30) Foreign Application Priority Data

Apr. 24, 2019 (JP) .............................. JP2019-083060

(51) Int. Cl.
*G06T 7/66* (2017.01)
*G06T 7/73* (2017.01)
(Continued)

(52) U.S. Cl.
CPC ................. *G06T 7/74* (2017.01); *G06T 7/66* (2017.01); *A63F 13/211* (2014.09);
(Continued)

(58) Field of Classification Search
CPC ............. G06T 2207/30204; G06T 7/66; G06T 2207/20132; G06T 2210/12;
(Continued)

(56) References Cited

U.S. PATENT DOCUMENTS 9,704,246 B2* 7/2017 Yamaguchi ............... G06T 7/12
10,293,252 B2* 5/2019 Yokokawa ............ A63F 13/843
(Continued)

FOREIGN PATENT DOCUMENTS

JP 2007-296248 A 11/2007
JP 2011-164076 A 8/2011
(Continued)

OTHER PUBLICATIONS

Japanese Office Action dated Dec. 13, 2022 for the Corresponding Japanese Patent Application No. 2019-083060.

*Primary Examiner* — Sumati Lefkowitz
*Assistant Examiner* — Michael Adam Shariff
(74) *Attorney, Agent, or Firm* — Katten Muchin Rosenman LLP

(57) ABSTRACT

An information processing apparatus includes a captured image acquisition unit that acquires an image captured by imaging a device including plural markers. A marker image coordinate specification unit specifies a representative coordinate of each marker image from the captured image, and a position and posture derivation unit derives position information and posture information of the device using the representative coordinates of the marker images. The marker image coordinate specification unit specifies a first boundary box surrounding a region within which pixels having a first luminance or more continuously appear, specifies a second boundary box surrounding a region within which pixels having a second luminance or more continuously appear in the first boundary box, the second luminance being higher than the first luminance, and derives a representative coordinate of each marker image based on pixels in the first or second boundary box in response to the number of specified second boundary boxes.

8 Claims, 14 Drawing Sheets

(51) Int. Cl.
    *A63F 13/23*     (2014.01)
    *A63F 13/213*    (2014.01)
    *A63F 13/211*    (2014.01)

(52) U.S. Cl.
    CPC .............. *A63F 13/213* (2014.09); *A63F 13/23* (2014.09); *A63F 2300/105* (2013.01); *A63F 2300/1025* (2013.01); *A63F 2300/1093* (2013.01); *G06T 2207/30204* (2013.01)

(58) Field of Classification Search
    CPC .................. G06T 7/10–194; G06T 7/74; A63F 2300/1093; A63F 13/213; A63F 13/211; A63F 13/53; A63F 13/23; A63F 2300/1025; A63F 2300/105; G06V 10/60; G09G 3/002; G09G 2360/16; G09G 2300/0465; G06F 3/0346; G06F 3/012; G06F 3/011; G02B 27/0172; G02B 2027/0138; G02B 2027/014
    See application file for complete search history.

(56) References Cited

U.S. PATENT DOCUMENTS

| | | | | |
|---|---|---|---|---|
| 10,661,177 | B2* | 5/2020 | Kataoka | A63F 13/40 |
| 2018/0278824 | A1* | 9/2018 | Somasundaram | G06T 11/60 |
| 2019/0370546 | A1* | 12/2019 | Agarwal | G06V 40/165 |

FOREIGN PATENT DOCUMENTS

| | | | | |
|---|---|---|---|---|
| JP | 2014-127162 A | | 7/2014 | |
| JP | 2018-038469 A | | 3/2018 | |
| JP | 2018119833 | * | 8/2018 | ............ G01B 11/26 |
| WO | 2007/129432 | * | 11/2007 | ........... A63F 13/428 |
| WO | 2007129432 | * | 11/2007 | ........... A63F 13/428 |

* cited by examiner

14

14

14

14

14

INFORMATION PROCESSING APPARATUS AND REPRESENTATIVE COORDINATE DERIVATION METHOD

CROSS REFERENCE TO RELATED APPLICATIONS

This application claims the benefit of Japanese Priority Patent Application JP 2019-083060 filed Apr. 24, 2019, the entire contents of which are incorporated herein by reference.

BACKGROUND

The present disclosure relates to a technology for deriving a representative coordinate of a marker image included in a captured image.

Japanese Patent Laid-Open No. 2007-296248 discloses a game apparatus that acquires a frame image obtained by imaging the front of the game apparatus and estimates position information and posture information of a game controller in an actual space from a position of a light emitting diode (LED) image of the game controller in the frame image. Then, the game apparatus reflects the estimated position information and/or posture information on processing of a game application.

SUMMARY

In recent years, an information processing technology of tracking a position or a posture of a device and reflecting the position or the posture on a three-dimensional (3D) model in a virtual reality (VR) space is widespread. An information processing apparatus operatively associates a movement of a player character or a game object in a game space with a change in position and posture of a device that is a tracking target to realize an intuitive operation by a user.

In order to estimate the position and the posture of the device, a plurality of light emitting markers are attached to the device. The information processing apparatus specifies representative coordinates of a plurality of marker images included in an image captured by imaging the device and compares the specified coordinates with three-dimensional coordinates of a plurality of markers in a three-dimensional model of the device to estimate the position and the posture of the device in an actual space. In order to estimate the position and the posture of the device with high accuracy, it may be necessary for a representative coordinate of each marker image in a captured image to be specified with high accuracy.

Therefore, it is desirable to provide a technology for deriving a representative coordinate of a marker image in a captured image. It is to be noted that, although the device may be an inputting device having an operation button, it may otherwise be a device that becomes a target of tracking without having an operation member.

According to an embodiment of the present disclosure, there is provided an information processing apparatus including a captured image acquisition unit configured to acquire an image captured by imaging a device that includes a plurality of markers, and an estimation processing unit configured to estimate position information and posture information of the device on a basis of marker images in the captured image. The estimation processing unit includes a marker image coordinate specification unit configured to specify a representative coordinate of each of the marker images from the captured image, and a position and posture derivation unit configured to derive the position information and the posture information of the device using the representative coordinates of the marker images. The marker image coordinate specification unit includes a first boundary box specification unit configured to specify a first boundary box surrounding a region within which pixels having a luminance equal to or higher than a first luminance continuously appear, a second boundary box specification unit configured to specify a second boundary box surrounding a region within which pixels having a luminance equal to or higher than a second luminance continuously appear in the first boundary box, the second luminance being higher than the first luminance, and a representative coordinate derivation unit configured to derive the representative coordinate of each of the marker images on a basis of pixels in the first boundary box or the second boundary box in response to the number of second boundary boxes specified by the second boundary box specification unit.

According to another embodiment of the present disclosure, there is provided a representative coordinate derivation method for deriving a representative coordinate of a marker image included in a captured image. The representative coordinate derivation method includes specifying a first boundary box surrounding a region within which pixels having a luminance equal to or higher than a first luminance continuously appear, specifying a second boundary box surrounding a region within which pixels having a luminance equal to or higher than a second luminance continuously appear in the first boundary box, the second luminance being higher than the first luminance, and deriving the representative coordinate of the marker image on a basis of pixels in the first boundary box or the second boundary box in response to the number of specified second boundary boxes.

The above and other objects, features and advantages of the present disclosure will become apparent from the following description and the appended claims, taken in conjunction with the accompanying drawings in which like parts or elements are denoted by like reference symbols.

DETAILED DESCRIPTION OF THE PREFERRED EMBODIMENT

Figure 1:
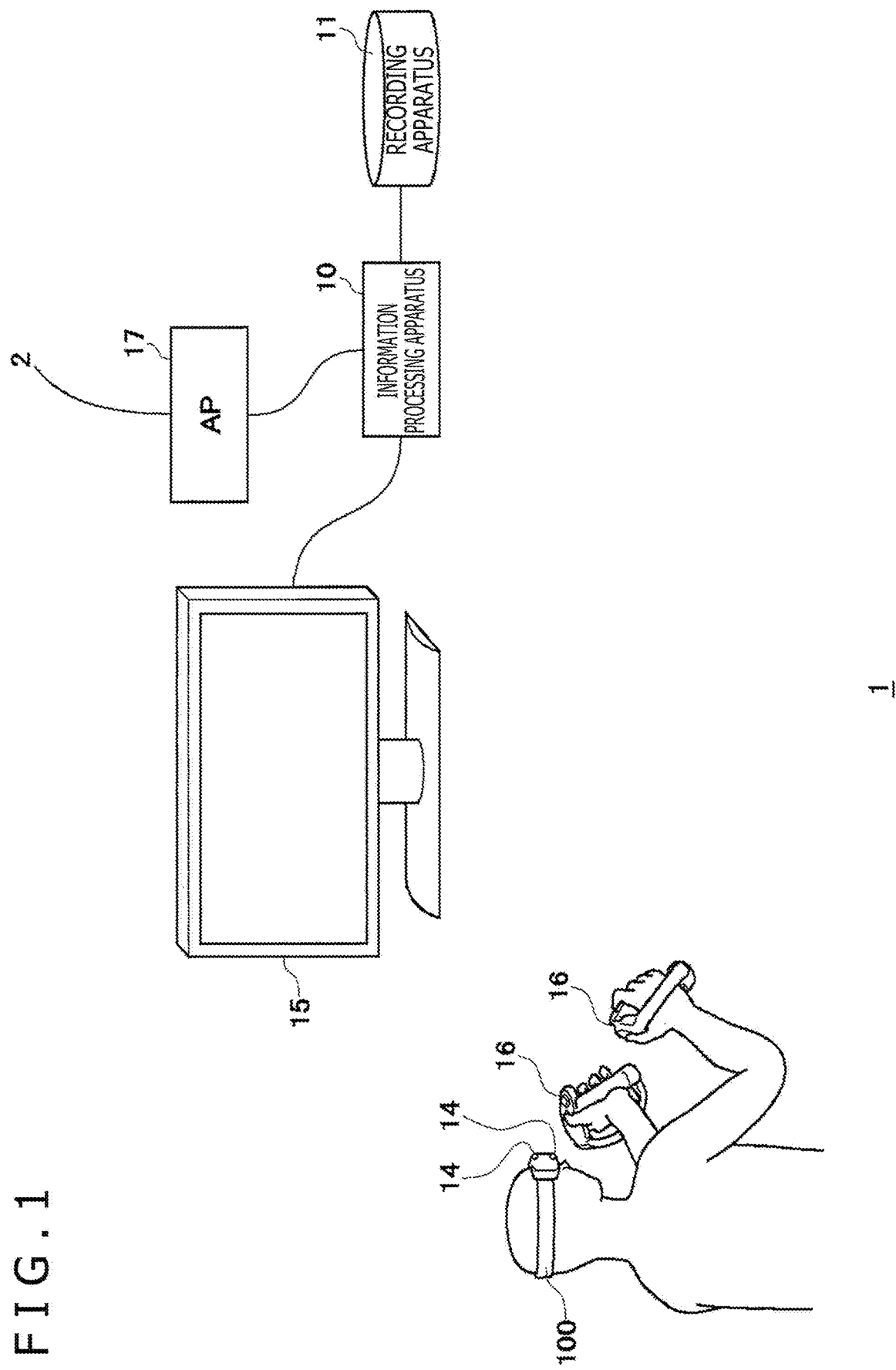
FIG. 1 is a view depicting an example of a configuration of an information processing system according to an embodiment.

FIG. 1 depicts an example of a configuration of an information processing system according to an embodiment of the present disclosure. Referring to FIG. 1, an information processing apparatus is denoted by 1 and includes an information processing apparatus 10, a recording apparatus 11, a head-mounted display (HMD) 100, inputting devices 16 for being operated by a user with fingers of the hands, and an outputting apparatus 15 that outputs an image and sound. The outputting apparatus 15 may be a television set. The information processing apparatus 10 is connected to an external network 2 such as the Internet through an access point (AP) 17. The AP 17 has functions of a wireless access point and a router. The information processing apparatus 10 may be connected to the AP 17 by a cable or by a known wireless communication protocol.

The recording apparatus 11 records applications of system software and game software. The information processing apparatus 10 may download game software from a content server into the recording apparatus 11 through the network 2. The information processing apparatus 10 executes the game software and supplies image data and sound data of the game to the HMD 100. The information processing apparatus 10 and the HMD 100 may be connected to each other by a known wireless communication protocol or by a cable.

The HMD 100 is a display apparatus that displays an image on a display panel positioned in front of the eyes of the user when the user wears the HMD 100 on the head. The HMD 100 displays an image for the left eye on a display panel for the left eye and displays an image for the right eye on a display panel for the right eye separately from each other. The images configure parallax images viewed from left and right viewpoints to implement a stereoscopic vision. Since the user views the display panels through optical lenses, the information processing apparatus 10 corrects optical distortion of parallax image data due to the lenses and then supplies the parallax image data to the HMD 100.

Although the outputting apparatus 15 is not necessary for the user who wears the HMD 100, by preparing the outputting apparatus 15, another user can view a display image on the outputting apparatus 15. Although the information processing apparatus 10 may cause the outputting apparatus 15 to display an image same as the image being viewed by the user who wears the HMD 100, the information processing apparatus 10 may cause the outputting apparatus 15 to display another image. For example, in such a case that the user wearing the HMD 100 and another user play a game together, the outputting apparatus 15 may display a game image from a character viewpoint of the other user.

The information processing apparatus 10 and each of the inputting devices 16 may be connected to each other by a known wireless communication protocol or may be connected to each other through a cable. The inputting device 16 includes a plurality of operation members such as operation buttons, and the user would operate the operation members with its fingers while gripping the inputting device 16. When the information processing apparatus 10 executes a game, the inputting device 16 is utilized as a game controller. The inputting device 16 includes a posture sensor including a three-axis acceleration sensor and a three-axis gyro sensor and transmits sensor data in a predetermined cycle such as 1600 Hz to the information processing apparatus 10.

A game of the embodiment handles not only operation information of the operation members of the inputting device 16 but also a position, a posture, a movement, and so forth of the inputting device 16 as operation information and reflects the operation information on a movement of a player character in a virtual three-dimensional space. For example, the operation information of the operation members may be utilized as information for moving the player character, and the operation information of the position, the posture, the movement, and so forth of the inputting device 16 may be utilized as information for moving an arm of the player character. If, in a battle scene in a game, a movement of the inputting device 16 is reflected on the movement of a player character having a weapon, then an intuitive operation by the user is realized and the immersion in the game is increased.

In order to track the position and the posture of the inputting device 16, a plurality of markers as light emitting parts are provided on the inputting device 16 such that they can be imaged by an imaging device 14 incorporated in the HMD 100. The information processing apparatus 10 analyzes images obtained by imaging the inputting device 16 to estimate position information and posture information of the inputting device 16 in the actual space. The information processing apparatus 10 then provides the estimated position information and posture information to the game.

The HMD 100 has a plurality of imaging devices 14 incorporated therein. The plurality of imaging devices 14 are attached in different postures at different positions of a front face of the HMD 100 such that a totaling imaging range of imaging ranges of them includes the overall field of view of the user. It is sufficient if the imaging devices 14 are image sensors that can acquire images of the plurality of markers of the inputting device 16. For example, in a case where the markers emit visible light, the imaging devices 14 include visible light sensors that are used in a general digital video camera such as a charge coupled device (CCD) sensor or a complementary metal oxide semiconductor (CMOS) sensor. In a case where the markers emit invisible light, each imaging device 14 includes an invisible light sensor. The plurality of imaging devices 14 image the front of the user in a predetermined cycle such as 60 frames per second at synchronized timings and transmit captured image data of the inputting device 16 to the information processing apparatus 10.

The information processing apparatus 10 specifies positions of the plurality of marker images of the inputting device 16 included in the captured images. It is to be noted that, although a single inputting device 16 is sometimes imaged at a same timing by plurality of imaging devices 14, since an attachment position and an attachment posture of each imaging device 14 are known, the information processing apparatus 10 synthesizes the plurality of captured images to specify the position of each marker image.

A three-dimensional shape of the inputting device 16 and position coordinates of the plurality of markers arranged on a surface of the inputting device 16 are known, and the information processing apparatus 10 estimates the position coordinate and the posture of the inputting device 16 on the basis of a distribution of the marker images in the captured image. The position coordinate of the inputting device 16 may be a position coordinate in a three-dimensional space having an origin at a reference position. The reference position may be a position coordinate, namely, a latitude and a longitude, set before the game is started.

It is to be noted that the information processing apparatus 10 can estimate the position coordinate and the posture of the inputting device 16 also by using sensor data detected by the posture sensors of the inputting device 16. Therefore, the information processing apparatus 10 of the present embodiment may perform a tracking process of the inputting device 16 with high accuracy using both an estimation result based on the captured images captured by the imaging devices 14 and an estimation result based on the sensor data.

Figure 2:
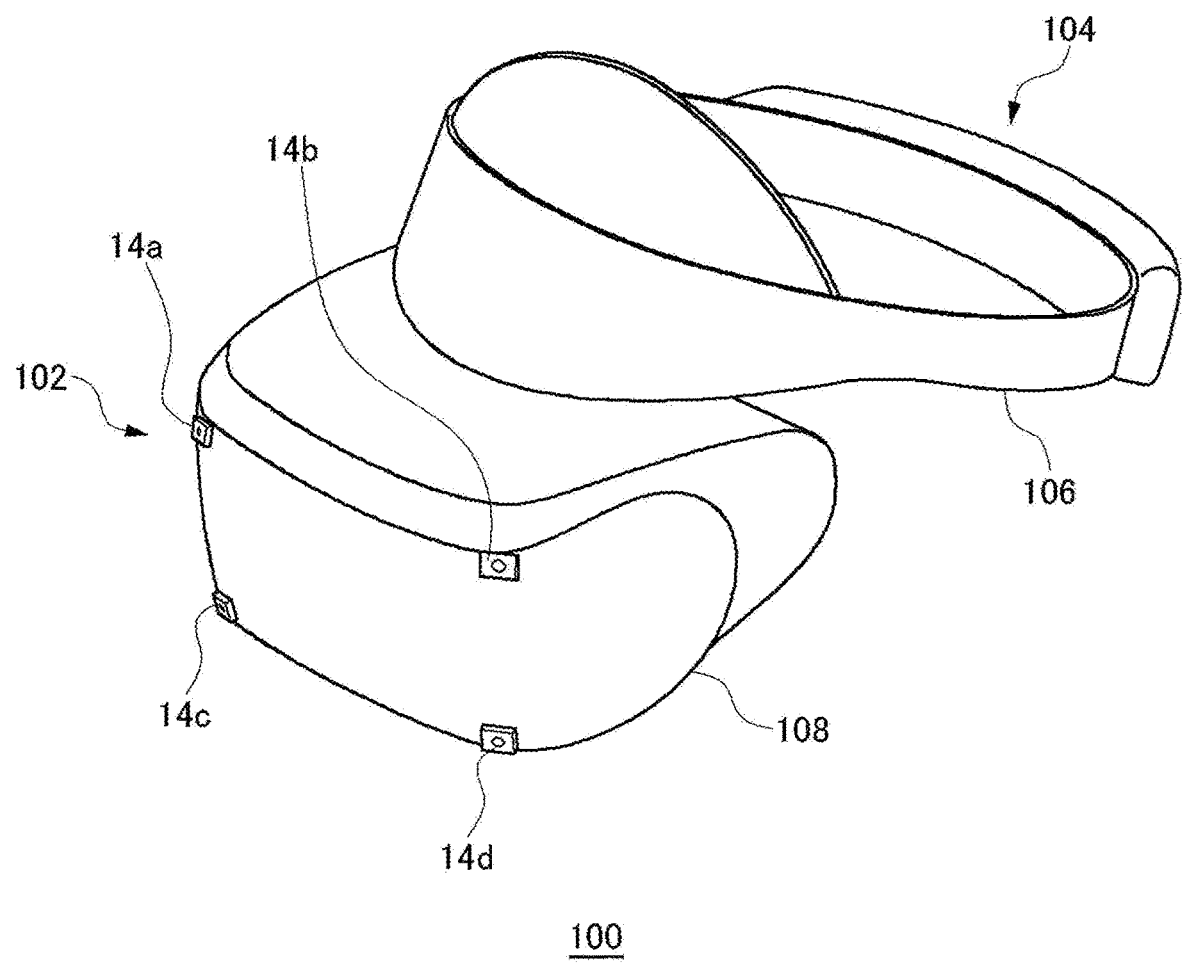
FIG. 2 is a view depicting an example of an appearance shape of an HMD.

FIG. 2 depicts an example of an appearance shape of the HMD 100. The HMD 100 includes an outputting mechanism unit 102 and a mounting mechanism unit 104. The mounting mechanism unit 104 includes a mounting band 106 that extends, when the HMD 100 is worn by the user, around the head of the user to fix the HMD 100 to the head. The mounting band 106 has a material or a structure that allows adjustment of the length in accordance with the circumference of the head of the user.

The outputting mechanism unit 102 includes a housing 108 that covers the left and right eyes in a state in which the user wears the HMD 100 and includes, in the inside thereof, a display panel that confronts the eyes when the user wears the HMD 100. The display panel may be a liquid crystal panel, an organic electroluminescence (EL) panel, or a like panel. The housing 108 further includes, in the inside thereof, a pair of left and right optical lenses that are positioned between the display panel and the eyes of the user and enlarge a viewing angle of the user. The HMD 100 may further include speakers or earphones at positions corresponding to the ears of the user, or external headphones may be connected to the HMD 100.

A plurality of imaging devices 14a, 14b, 14c, and 14d are provided on a front side outer face of the housing 108. With reference to a gaze direction of the user, the imaging device 14a is attached to an upper right corner of the front side outer face of the housing 108 such that its camera optical axis points right upward; the imaging device 14b is attached to an upper left corner of the front side outer face of the housing 108 such that its camera optical axis points left upward; the imaging device 14c is attached to a lower right corner of the front side outer face of the housing 108 such that its camera optical axis points right downward; and the imaging device 14d is attached to a lower left corner of the front side outer face of the housing 108 such that its camera optical axis points left downward. The plurality of imaging devices 14 are installed in this manner, so that the totaling imaging range of the imaging ranges of them includes the overall field of view of the user. The field of view of the user may be a field of view of the user in the three-dimensional virtual space.

The HMD 100 transmits sensor data detected by the posture sensors and image data captured by the imaging devices 14 to the information processing apparatus 10 and receives game image data and game sound data generated by the information processing apparatus 10.

Figure 3:
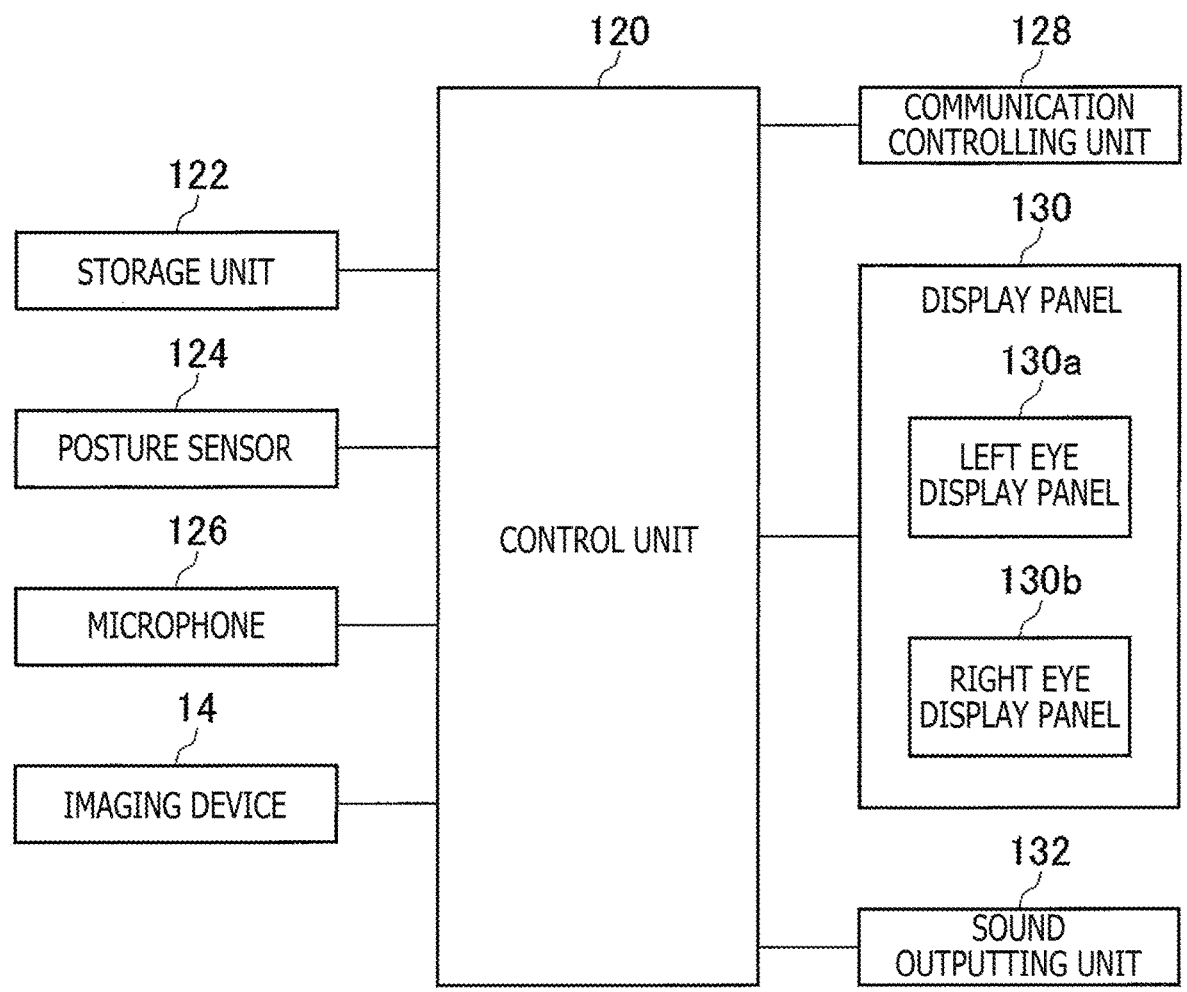
FIG. 3 is a block diagram depicting functional blocks of the HMD.

FIG. 3 depicts functional blocks of the HMD 100. Referring to FIG. 3, a control unit 120 is a main processor that processes and outputs various kinds of data such as image data, sound data, and sensor data and instructions. A storage unit 122 temporarily stores data and instructions to be processed by the control unit 120. A posture sensor 124 acquires sensor data relating to a movement of the HMD 100. The posture sensor 124 includes at least a three-axis acceleration sensor and a three-axis gyro sensor. The posture sensor 124 detects values of individual axial components, namely, sensor data, in a predetermined cycle such as 1600 Hz.

A communication controlling unit 128 transmits data outputted from the control unit 120 to the external information processing apparatus 10 by wired or wireless communication through a network adapter or an antenna. Further, the communication controlling unit 128 receives data from the information processing apparatus 10 and outputs the data to the control unit 120.

Upon receiving game image data and game sound data from the information processing apparatus 10, the control unit 120 supplies the game image data to a display panel 130 so as to be displayed on the display panel 130 and supplies the sound image data to a sound outputting unit 132 so as to be outputted as sound from the sound outputting unit 132. The display panel 130 includes a left eye display panel 130a and a right eye display panel 130b such that a pair of parallax images are displayed on the display panels. Further, the control unit 120 controls the communication controlling unit 128 to transmit sensor data from the posture sensor 124, sound data from a microphone 126, and captured image data from the imaging devices 14 to the information processing apparatus 10.

Figure 4B:
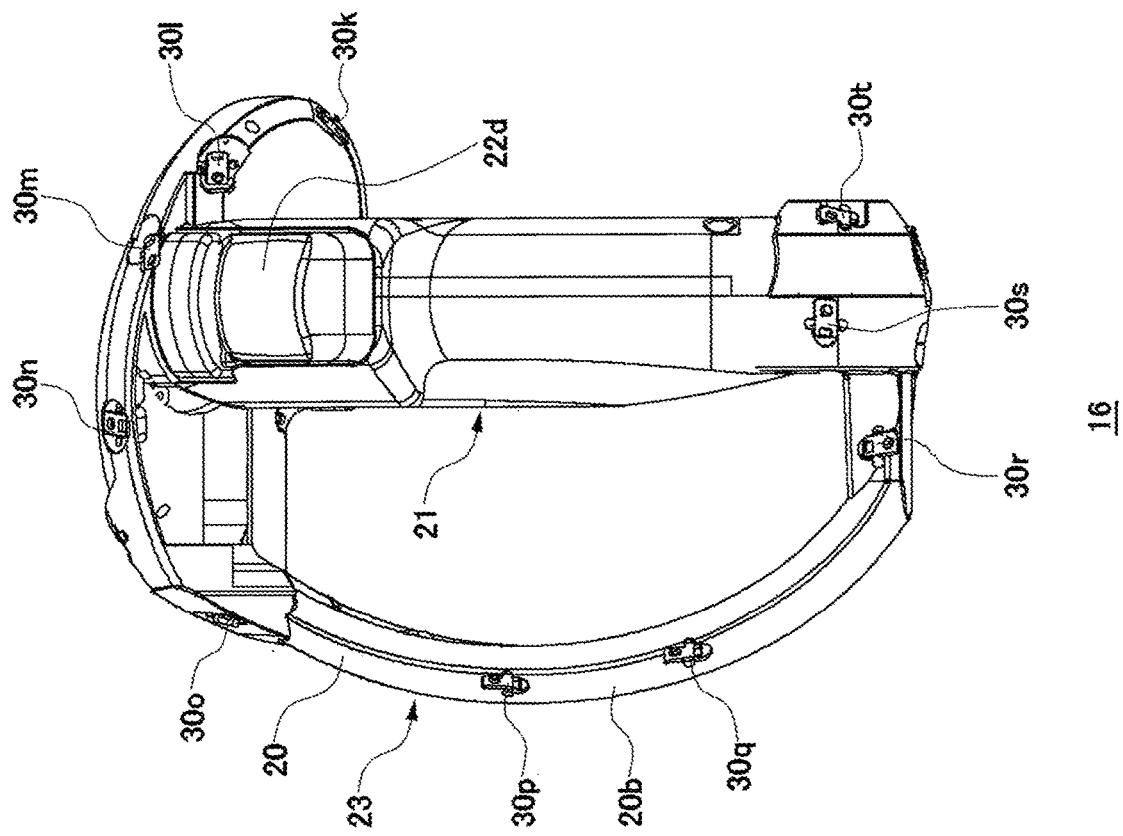
FIGS. 4A and 4B are views depicting an appearance shape of an inputting device.
Figure 4A:
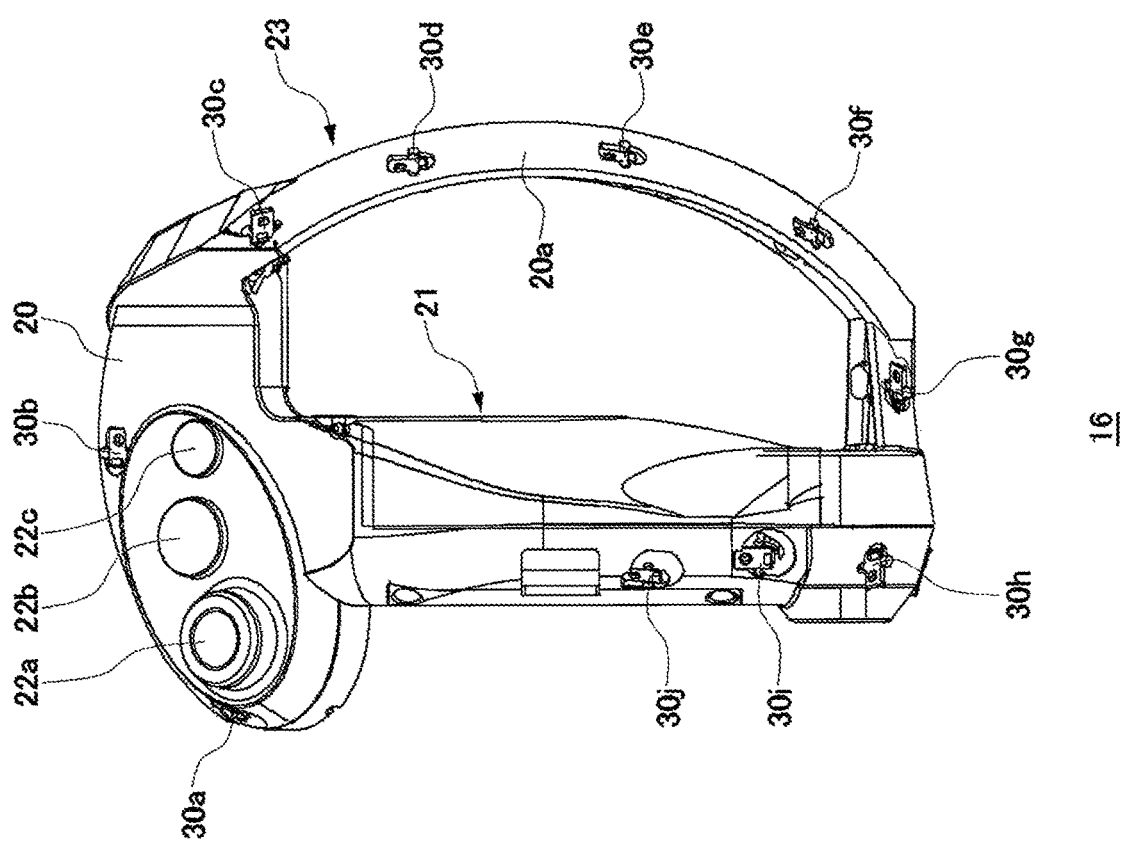

FIGS. 4A and 4B depict an appearance shape of the inputting device 16. In particular, FIG. 4A depicts a front shape of the inputting device 16 and FIG. 4B depicts a rear shape of the inputting device 16. The inputting device 16 includes a case body 20, a plurality of operation members 22a, 22b, 22c, and 22d for being operated by the user, and a plurality of markers 30a to 30t that emit light to the outside of the case body 20. In the case where the operation members 22a, 22b, 22c, and 22d are not specifically distinguished from each other, each of them is hereinafter referred to as operation member 22. Further, in the case where the markers 30a to 30t are not specifically distinguished from each other, each of them is referred to as marker 30. The operation members 22 are arranged at a head portion of the case body 20 and include an analog stick provided for tilting operation, a depression button, a trigger button for inputting a pull amount, and so forth.

The case body 20 has a grip part 21 and a curved part 23 that connects a case body head portion and a case body bottom portion to each other. The user would pass the fingers from the forefinger to the little finger between the grip part 21 and the curved part 23 and grip the grip part 21. In the state in which the user grips the grip part 21, the user would operate the operation members 22a, 22b, and 22c with the thumb and operate the operation member 22d with the forefinger. While the markers 30h, 30i, and 30j are provided on the grip part 21, they are arranged at positions at which they are not hidden by the hand even in the state in which the user grips the grip part 21. By providing one or more markers 30 on the grip part 21, estimation accuracy of the position and the posture of the inputting device 16 can be increased.

Each marker 30 is a light emitting part that emits light to the outside of the case body 20 and includes a resin portion through which light from a light source such as an LED device is diffused and emitted to the outside. The marker 30 is imaged by an imaging device 14 and utilized in an estimation process of the position and the posture of the inputting device 16. Since the imaging devices 14 image the inputting device 16 in a predetermined cycle, for example, of 60 frames per second, preferably the markers 30 emit light in synchronism with periodical imaging timings of the imaging devices 14 while it is turned off during a non-exposure period by the imaging devices 14 to suppress useless power consumption.

Figure 5:
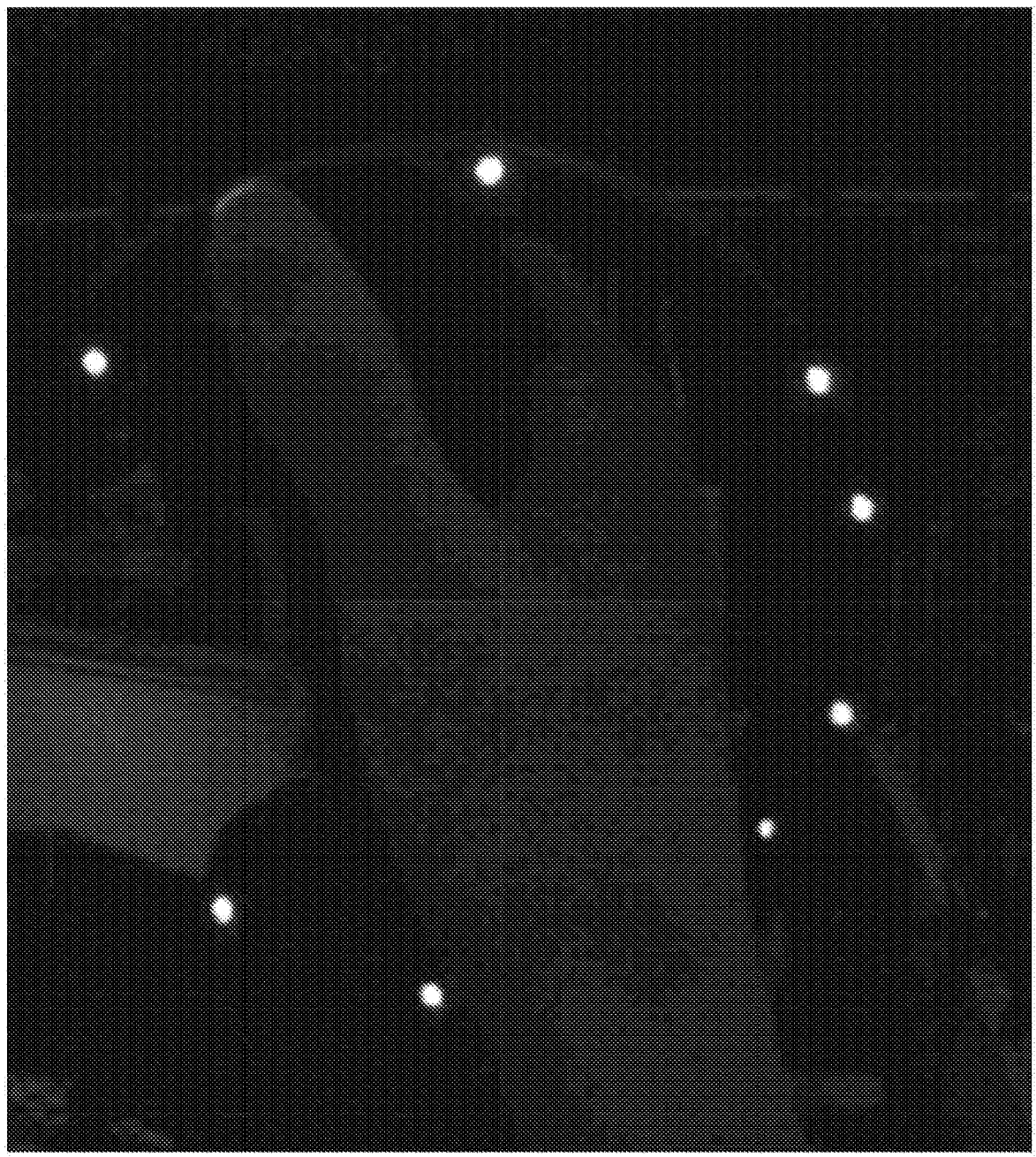
FIG. 5 is a view depicting an example of part of an image when the inputting device is imaged.

FIG. 5 depicts an example of part of an image when the inputting device 16 is imaged. This image is a captured image of the inputting device 16 gripped by the right hand and includes images of the plurality of markers 30 that emit light. In the HMD 100, the communication controlling unit 128 transmits image data captured by the imaging devices 14 to the information processing apparatus 10 in a predetermined cycle.

Figure 6:
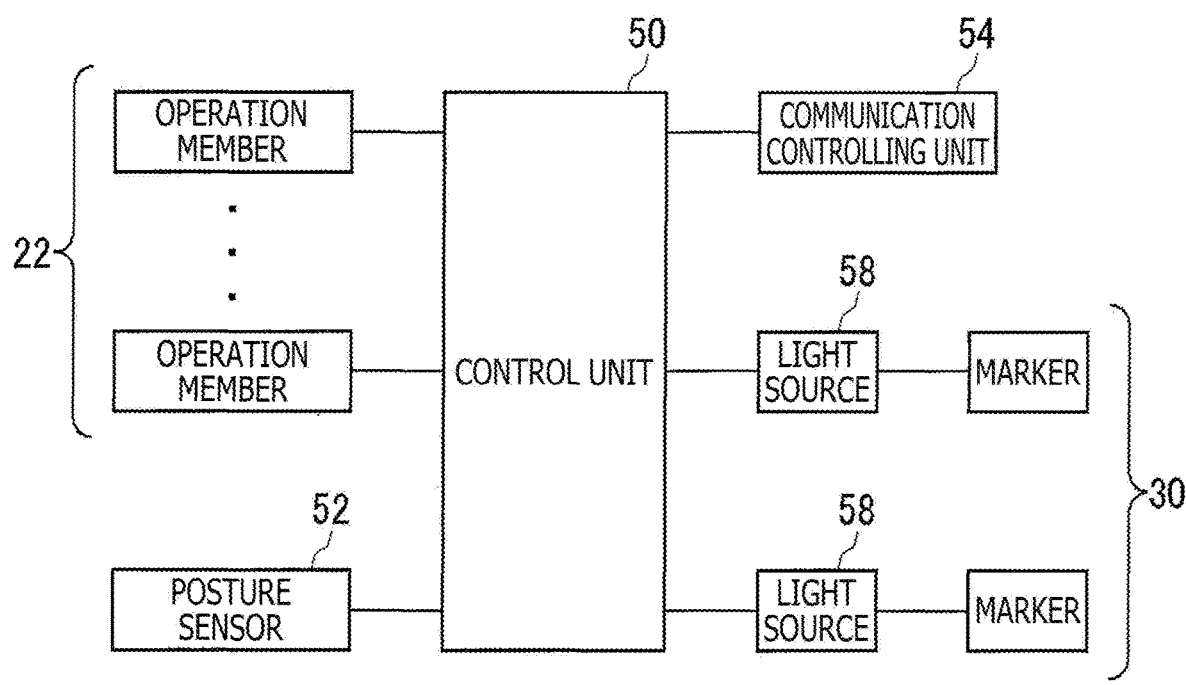
FIG. 6 is a block diagram depicting functional blocks of the inputting device.

FIG. 6 depicts functional blocks of the inputting device 16. A control unit 50 accepts operation information inputted to the operation member 22 and accepts sensor data acquired by a posture sensor 52. The posture sensor 52 acquires sensor data relating to a movement of the inputting device 16. The posture sensor 52 includes at least a three-axis acceleration sensor and a three-axis gyro sensor. The posture sensor 52 detects values of individual axial components, namely, sensor data, in a predetermined cycle such as 1600 Hz. The control unit 50 supplies the operation information and sensor data thus accepted to a communication controlling unit 54. The communication controlling unit 54 transmits the operation information and the sensor data outputted from the control unit 50 to the information processing apparatus 10 by wired or wireless communication through a network adapter or an antenna. Further, the communication controlling unit 54 acquires a light emission instruction from the information processing apparatus 10.

The inputting device 16 includes a plurality of light sources 58 for turning on the plurality of markers 30. The light sources 58 may each be an LED device that emits light of a predetermined color. The control unit 50 controls the light sources 58 on the basis of a light emission instruction acquired from the information processing apparatus 10 to emit light to turn on the markers 30.

Figure 7:
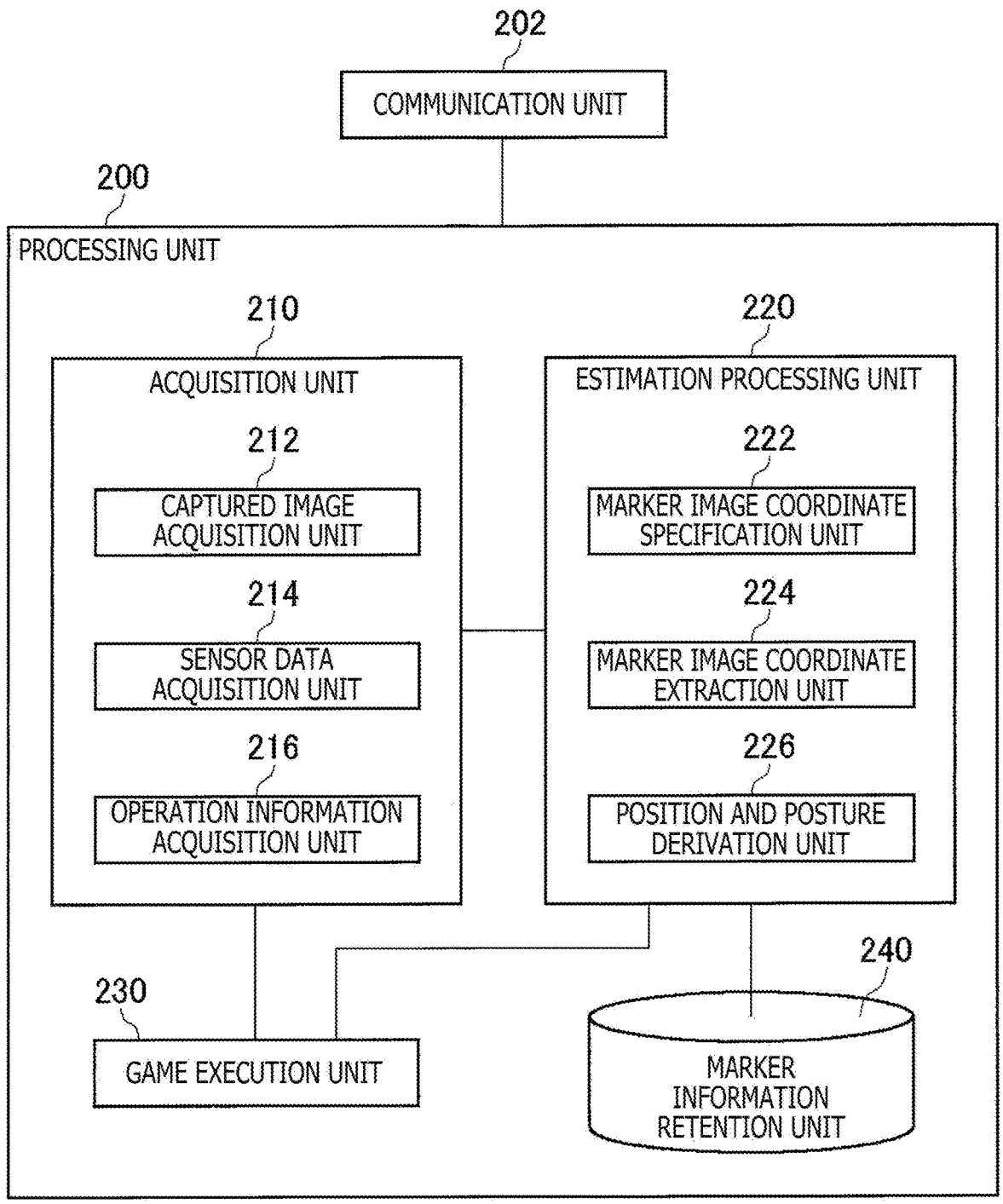
FIG. 7 is a block diagram depicting functional blocks of an information processing apparatus.

FIG. 7 depicts functional blocks of the information processing apparatus 10. Referring to FIG. 7, the information processing apparatus 10 includes a processing unit 200 and a communication unit 202. The processing unit 200 includes an acquisition unit 210, an estimation processing unit 220, a game execution unit 230, and a marker information retention unit 240. The communication unit 202 receives operation information and sensor data transmitted from the inputting device 16 and supplies the operation information and the sensor data to the acquisition unit 210. Further, the communication unit 202 receives captured image data and sensor data transmitted from the HMD 100 and supplies the captured image data and the sensor data to the acquisition unit 210.

The acquisition unit 210 includes a captured image acquisition unit 212, a sensor data acquisition unit 214, and an operation information acquisition unit 216. The estimation processing unit 220 includes a marker image coordinate specification unit 222, a marker image coordinate extraction unit 224, and a position and posture derivation unit 226. The estimation processing unit 220 estimates position information and posture information of the inputting device 16 on the basis of marker images in a captured image. The estimation processing unit 220 supplies the position information and the posture information of the inputting device 16 to the game execution unit 230.

These components can be implemented, in terms of hardware, by an arbitrary processor, a memory, and other large scale integrations (LSIs) and, in terms of software, by a program loaded in the memory and so forth. However, in FIG. 7, functional blocks implemented by cooperation of them are depicted. Accordingly, it can be recognized by those skilled in the art that the blocks can be implemented in various forms only by hardware, only by software, or by a combination of them.

The captured image acquisition unit 212 acquires a captured image of the inputting device 16 including the plurality of markers 30 and supplies the image to the estimation processing unit 220. The sensor data acquisition unit 214 acquires sensor data transmitted from the inputting device 16 and the HMD 100 and supplies the sensor data to the estimation processing unit 220. The operation information acquisition unit 216 acquires operation information transmitted from the inputting device 16 and supplies the operation information to the game execution unit 230. The game execution unit 230 proceeds with the game on the basis of the operation information and the position and posture information of the inputting device 16.

The marker image coordinate specification unit 222 specifies a two-dimensional coordinate (hereinafter referred to also as "marker image coordinate") that represents an image of each marker 30 included in a captured image. The marker image coordinate specification unit 222 may specify a region of pixels having a luminance value equal to or higher than a predetermined value and calculate and determine a gravity center coordinate of the pixel region as a marker image representative coordinate. A derivation method for deriving a representative coordinate by the marker image coordinate specification unit 222 is hereinafter described.

As a technique for estimating, from a captured image of an object having a known three-dimensional shape and size, a position and a posture of an imaging device by which the captured image is imaged, a method of solving a perspective n-point (PNP) problem is known. In the embodiment, the marker image coordinate extraction unit 224 extracts N two-dimensional marker image coordinates in the captured image, N being an integer equal to or greater than three. Then, the position and posture derivation unit 226 derives position information and posture information of the inputting device 16 from the N marker image coordinates extracted by the marker image coordinate extraction unit 224 and three-dimensional coordinates of N markers in a three-dimensional model of the inputting device 16. The position and posture derivation unit 226 estimates a position and a posture of the imaging devices 14 using expression 1 given below and derives position information and posture information in the three-dimensional space of the inputting device 16 on the basis of a result of the estimation.

[Math. 1]

$$S\begin{bmatrix}u\\v\\1\end{bmatrix}=\begin{bmatrix}f_x & 0 & 0\\0 & f_y & 0\\0 & 0 & 1\end{bmatrix}\begin{bmatrix}r_{11} & r_{12} & r_{13} & t_1\\r_{21} & r_{22} & r_{23} & t_2\\r_{31} & r_{32} & r_{33} & t_3\end{bmatrix}\begin{bmatrix}X\\Y\\Z\\1\end{bmatrix} \quad \text{(expression 1)}$$

Here, (u, v) is a marker image coordinate in the captured image, and (X, Y, Z) is a position coordinate in the three-dimensional space of the marker 30 when the three-dimensional model of the inputting device 16 is in a reference position and a reference posture. It is to be noted that the three-dimensional model is a model that has a shape and a size completely same as those of the inputting device 16 and has markers arranged at respective same positions. The marker information retention unit 240 retains three-dimensional coordinates of the markers in the three-dimensional model that is in the reference position and the reference posture. The position and posture derivation unit 226 reads out the three-dimensional coordinates of the markers from the marker information retention unit 240 to acquire the position coordinates (X, Y, Z).

In the expression 1 above, ($f_x$, $f_y$) is a focal distance of the imaging device 14 and ($c_x$, $c_y$) is an image principal point, and both of them are internal parameters of the imaging device 14. A matrix whose elements are $r_{11}$ to $r_{33}$ and $t_1$ to $t_3$ is a rotation and translation matrix. In the expression 1 above, (u, v), ($f_x$, $f_y$), ($c_x$, $c_y$), and (X, Y, Z) are known, and the position and posture derivation unit 226 solves the equation for the N markers 30 to determine a rotation and translation matrix common to them. The position and posture derivation unit 226 derives position information and posture information of the inputting device 16 on the basis of an angle and a translation amount represented by the matrix. In the embodiment, the process of estimating the position and posture of the inputting device 16 is performed by solving the PNP problem. Accordingly, the position and posture derivation unit 226 derives the position and the posture of the inputting device 16 using three marker image coordinates and three three-dimensional marker coordinates of the three-dimensional model of the inputting device 16.

Figure 8:
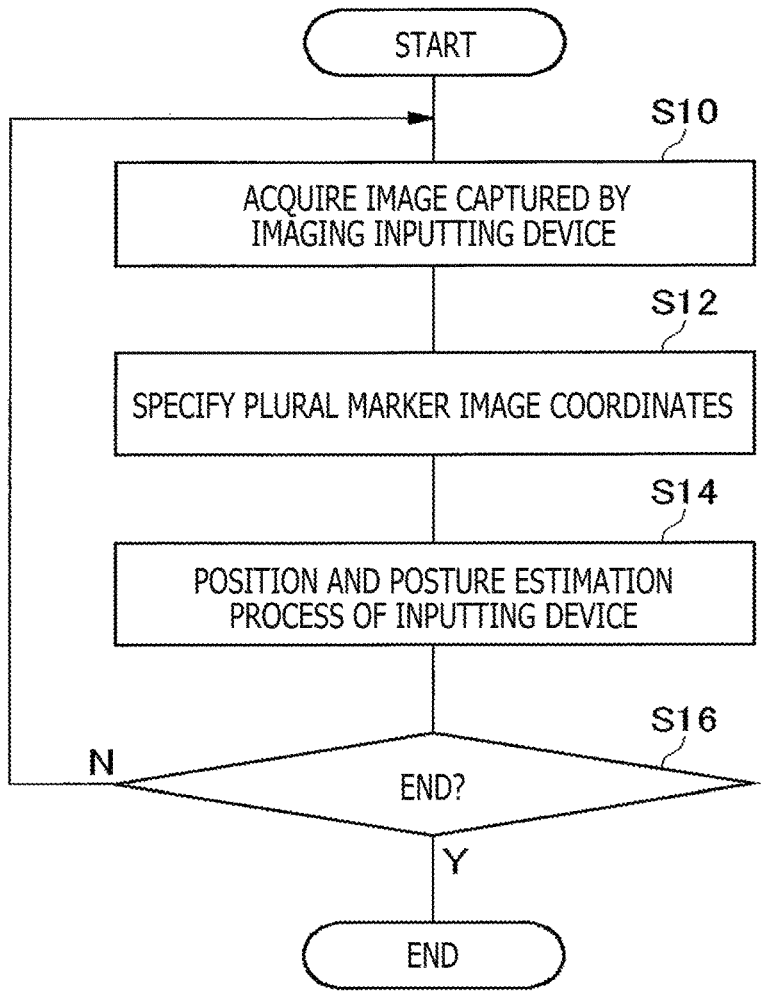
FIG. 8 is a flow chart of a position and posture estimation process by an estimation processing unit of the information processing apparatus.

FIG. 8 is a flow chart of a position and posture estimation process by the estimation processing unit 220. If the captured image acquisition unit 212 acquires an image captured by imaging the inputting device 16 (S10), then the marker image coordinate specification unit 222 specifies representative coordinates of a plurality of marker images included in the captured image (S12).

The marker image coordinate extraction unit 224 extracts three arbitrary marker image coordinates from among the plurality of marker image coordinates specified by the marker image coordinate specification unit 222. The marker information retention unit 240 has retained three-dimensional coordinates of markers in a three-dimensional model of the inputting device 16 that is in the reference position and in the reference posture. The position and posture derivation unit 226 reads out the three-dimensional coordinates of the markers in the three-dimensional model from the marker information retention unit 240 and solves the PNP problem using the expression 1. The position and posture derivation unit 226 specifies a rotation and translation matrix common to the extracted three marker image coordinates and calculates a re-projection error using the marker image coordinates of the inputting device 16 other than the three extracted marker image coordinates.

The marker image coordinate extraction unit 224 extracts a predetermined number of combinations of three marker image coordinates. The position and posture derivation unit 226 specifies a rotation and translation matrix for each of the combinations of the three extracted marker image coordinates to calculate a re-projection error of each combination. Then, the position and posture derivation unit 226 specifies a rotation and translation matrix that indicates a minimum re-projection error among the predetermined number of re-projection errors and derives position information and posture information of the inputting device 16 (S14). The position and posture derivation unit 226 supplies the derived position information and posture information of the inputting device 16 to the game execution unit 230.

The position and posture estimation process is performed in an imaging cycle of a captured image (N at S16). If the game execution unit 230 ends the game, then the position and posture estimation process by the estimation processing unit 220 ends (Y at S16).

Figure 9:
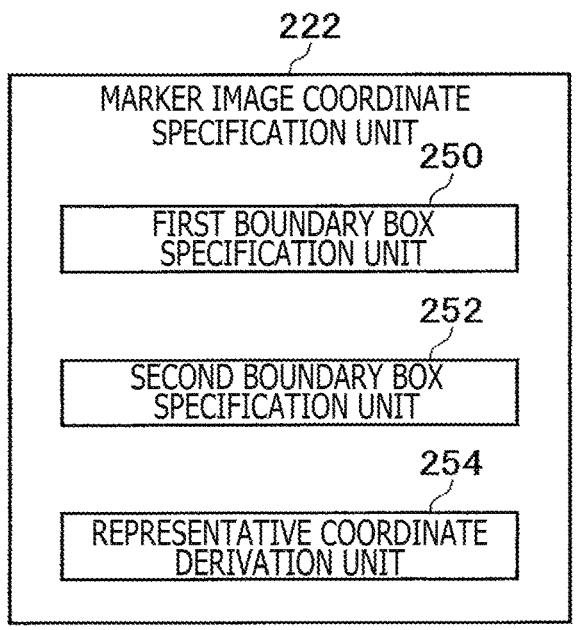
FIG. 9 is a view depicting functional blocks of a marker image coordinate specification unit of the estimation processing unit.

FIG. 9 depicts functional blocks of the marker image coordinate specification unit 222. The marker image coordinate specification unit 222 includes a first boundary box specification unit 250, a second boundary box specification unit 252, and a representative coordinate derivation unit 254.

Figure 10:
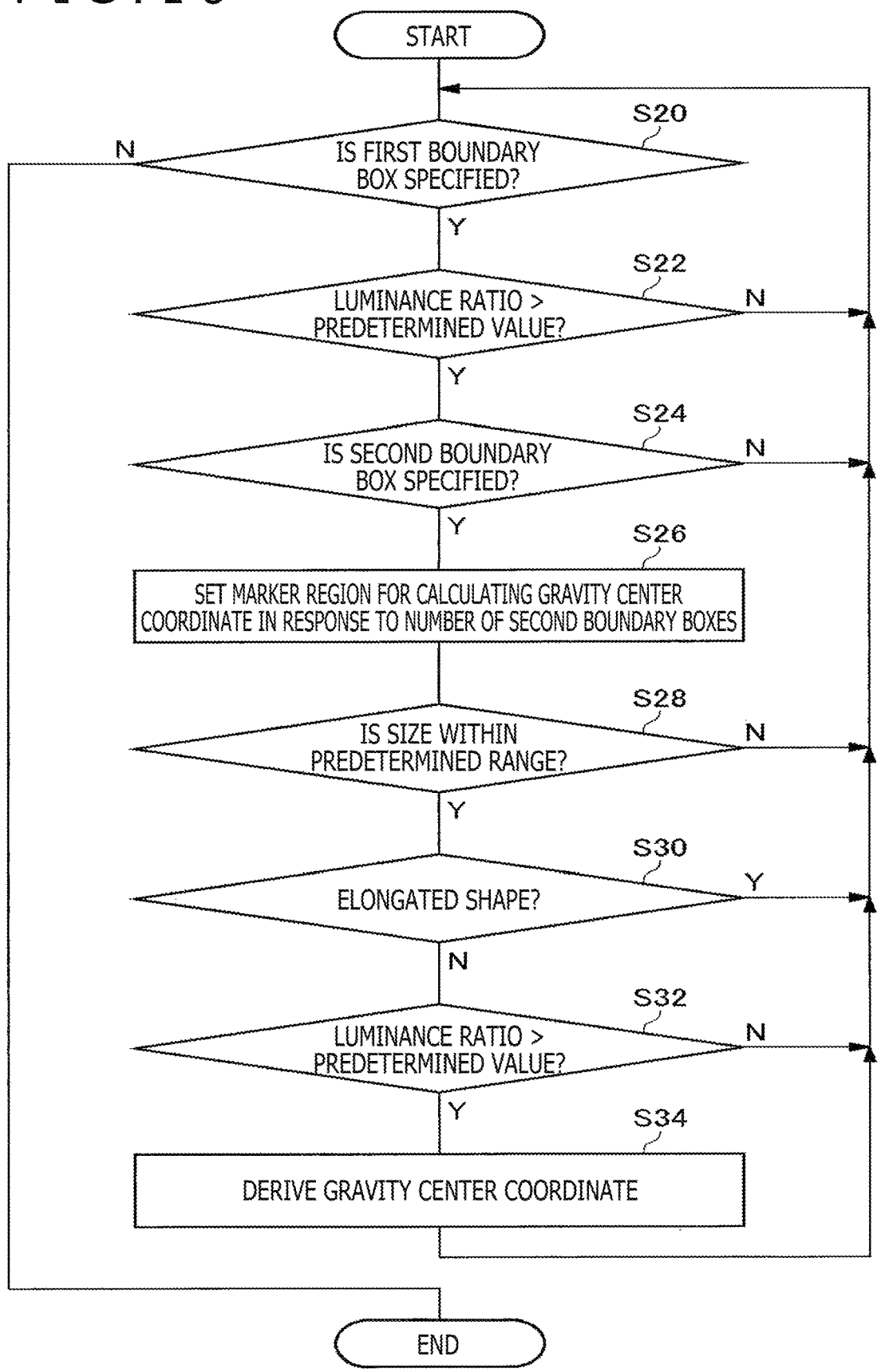
FIG. 10 is a flow chart of a derivation process of a marker image coordinate.

FIG. 10 is a flow chart of a derivation process of a marker image coordinate. The marker image coordinate specification unit 222 specifies a representative coordinate of a marker image from a captured image. The captured image in the embodiment is a gray scale image, and each of pixels of the captured image is represented by eight bits and has a luminance value of 0 to 255. In the captured image, a marker image is captured as an image having a high luminance as depicted in FIG. 5.

The first boundary box specification unit 250 searches for a region in which pixels having a luminance equal to or higher than a first luminance appear continuously in the captured image (S20). For example, the first luminance is a luminance value of 64. In a case where a region in which pixels having a luminance equal to or higher than the first luminance continuously appear does not exist (N at S20), the first boundary box specification unit 250 decides that the captured image does not include a marker image and ends the derivation process of a marker image coordinate.

Figure 11:
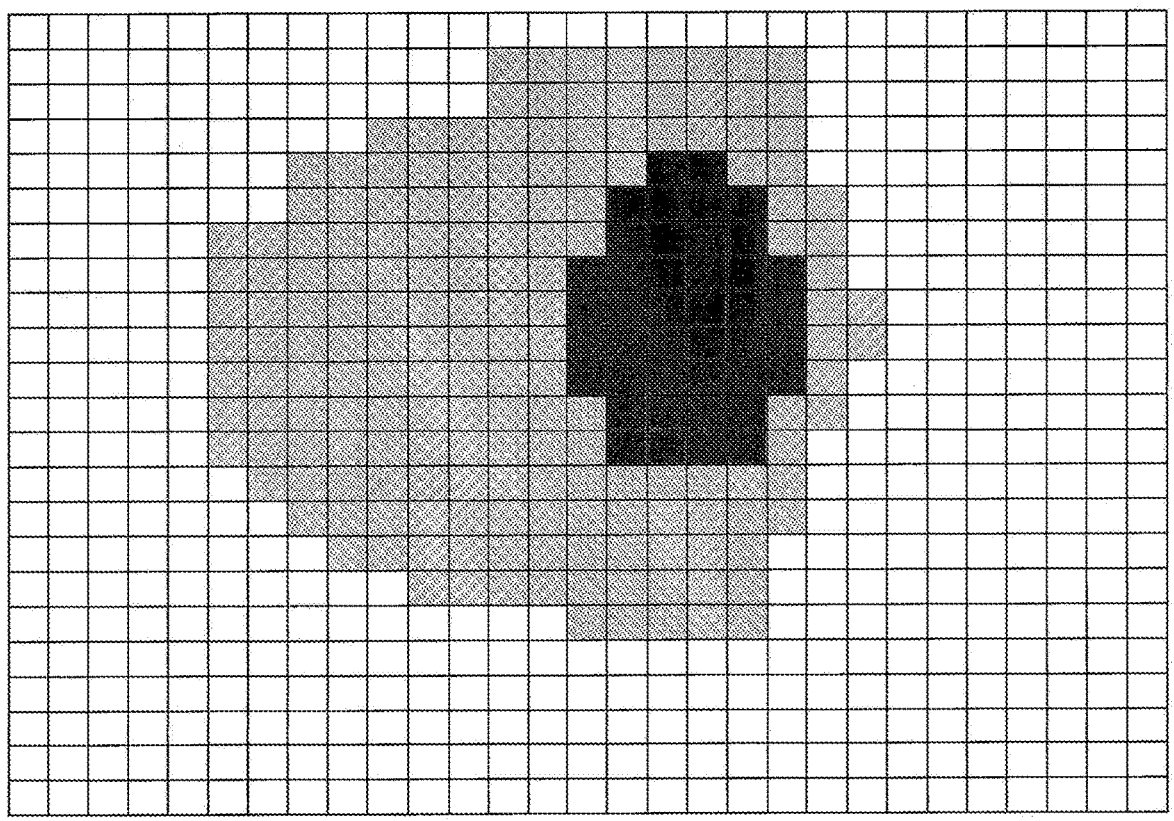
FIG. 11 is a view depicting a plurality of pixels in a captured image.

FIG. 11 depicts a plurality of pixels in a captured image. In a gray scale image captured actually, a pixel having a highest luminance value of 255 is represented by white while a pixel having a lowest luminance value of 0 is represented by black. In FIGS. 11 to 15, prioritizing the legibility, luminance representations of the pixels are inverted, in other words, black-and-white inverted. Accordingly, in FIGS. 11 to 15, black represents the luminance value of 255 (the highest luminance value) and white represents the luminance value of 0 (the lowest luminance value).

If the first boundary box specification unit 250 finds a region in which pixels having a luminance equal to or higher than the first luminance continuously appear, then it specifies a first boundary box that surrounds the region in which pixels having a luminance equal to or higher than the first luminance continuously appear (Y at S20).

Figure 12:
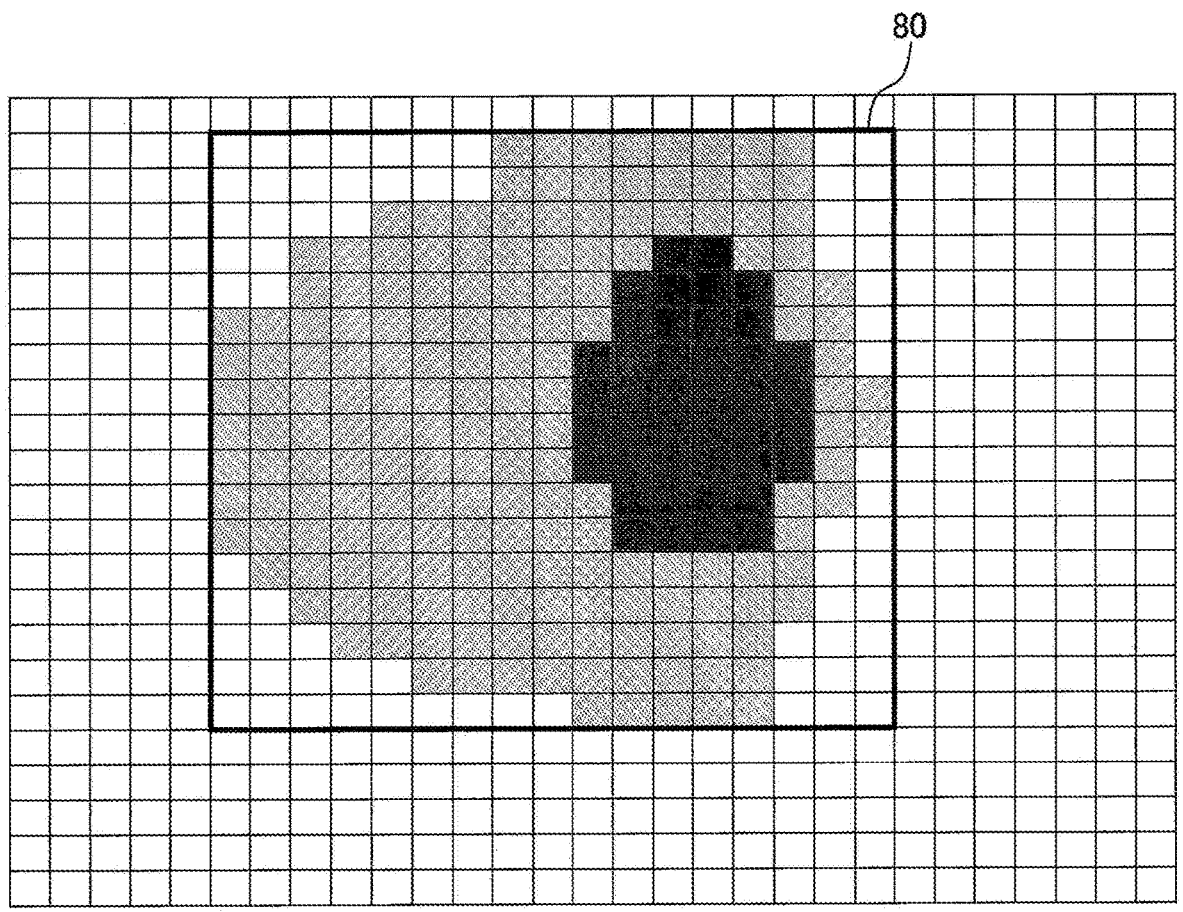
FIG. 12 is a view depicting a first boundary box.

FIG. 12 depicts a first boundary box 80 that surrounds the region in which pixels having a luminance equal to or higher than the first luminance continuously appear. The first boundary box 80 is a minimum rectangle that surrounds the region in which pixels having a luminance equal to or higher than the first luminance continuously appear.

The representative coordinate derivation unit 254 checks the contrast between the specified first boundary box 80 and a region around the first boundary box 80 (S22). If the first boundary box 80 includes a marker image, then an average luminance in the first boundary box 80 is high while an average luminance in the outside region of the first boundary box 80 is low. Therefore, the representative coordinate derivation unit 254 calculates an average luminance in the first boundary box 80 and an average luminance in a predetermined region outside the first boundary box 80 to obtain a luminance ratio between them.

Figure 13:
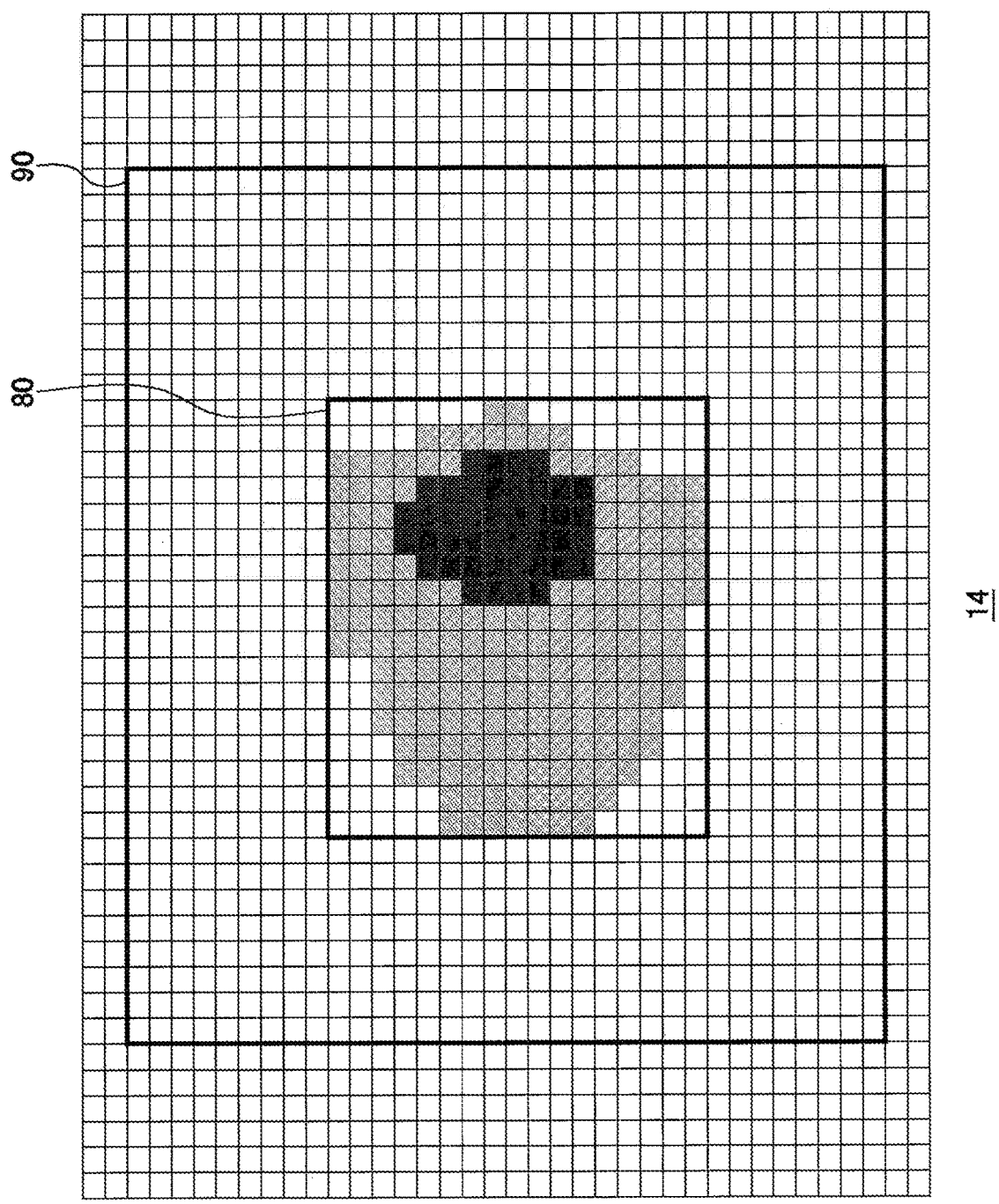
FIG. 13 is a view depicting a comparison frame set on an outer side of the first boundary box.

FIG. 13 depicts a comparison frame 90 set to the outside of the first boundary box 80. The comparison frame 90 is set such that a horizontal length and a vertical length of the comparison frame 90 are twice a horizontal length and a vertical length of the first boundary box 80 and a center position of the comparison frame 90 and a center position of the first boundary box 80 substantially coincide with each other. The representative coordinate derivation unit 254 calculates an average luminance B1 of the pixels in the first boundary box 80 and an average luminance B2 of pixels in the comparison frame 90 outside the first boundary box 80.

In a case where a luminance ratio B1/B2 is lower than a predetermined value (N at S22), the first boundary box specification unit 250 discards the first boundary box 80 and returns the processing to S20 to search for a new first boundary box. The predetermined value is, for example, 3.

In a case where the luminance ratio is equal to or higher than the predetermined value (Y at S22), the second boundary box specification unit 252 searches for a region in which pixels having a luminance equal to or higher than a second luminance continuously appear in the first boundary box 80 (S24). The second luminance is higher than the first luminance and is, for example, a luminance value of 128. In the case of a marker image, it is captured with a luminance higher than the second luminance. If the representative coordinate derivation unit 254 finds a region in which pixels having a luminance equal to or higher than the second luminance continuously appear, then it specifies a second boundary box that surrounds the region in which pixels having a luminance equal to or higher than the second luminance continuously appear (Y at S24).

Figure 14:
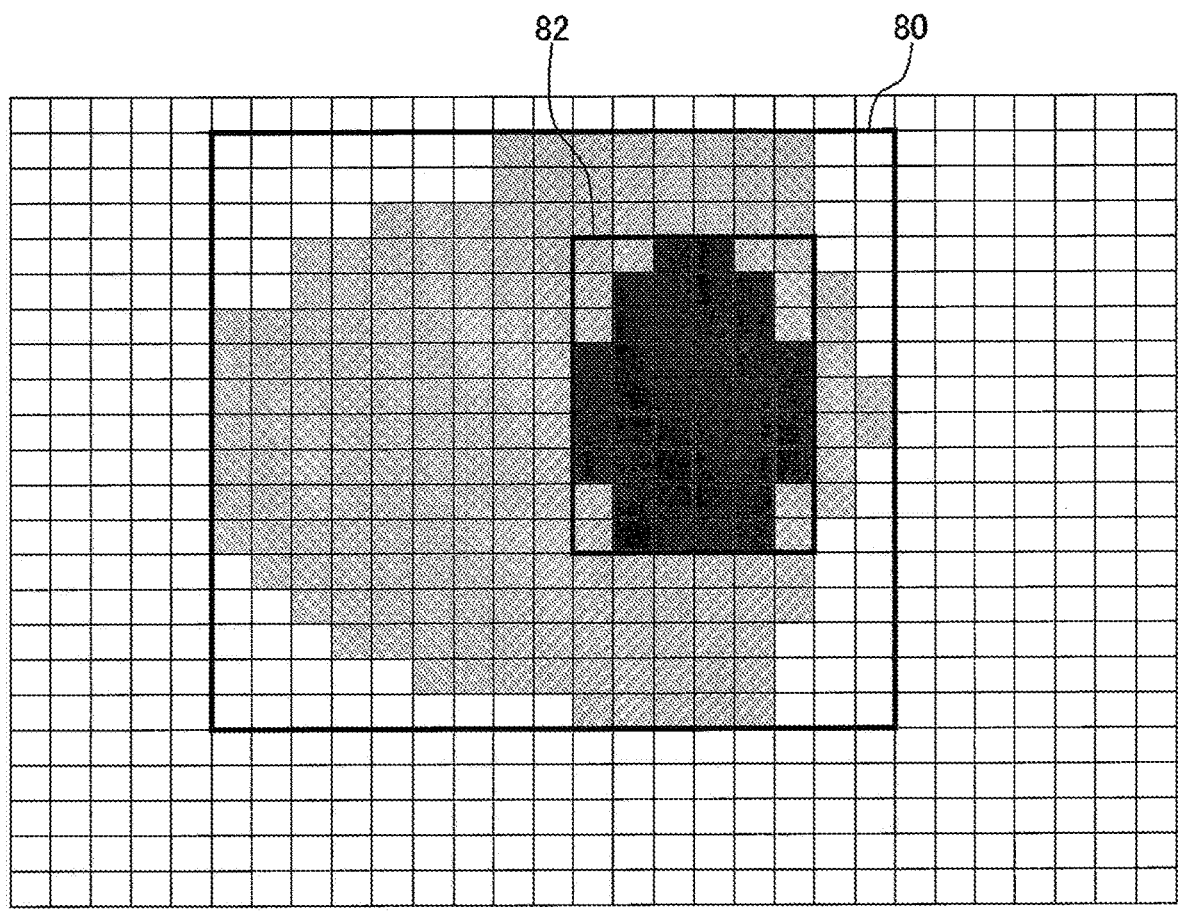
FIG. 14 is a view depicting a second boundary box.

FIG. 14 depicts a second boundary box 82 that surrounds a region in which pixels having a luminance equal to or higher than the second luminance continuously appear. The second boundary box 82 is a minimum rectangle that surrounds the region in which pixels having a luminance equal to or higher than the second luminance continuously appear. The second boundary box 82 includes an image of a marker 30 or an image of another high-luminance light emitting body. In FIG. 14, the second boundary box specification unit 252 specifies one second boundary box 82 in the first boundary box 80.

Figure 15:
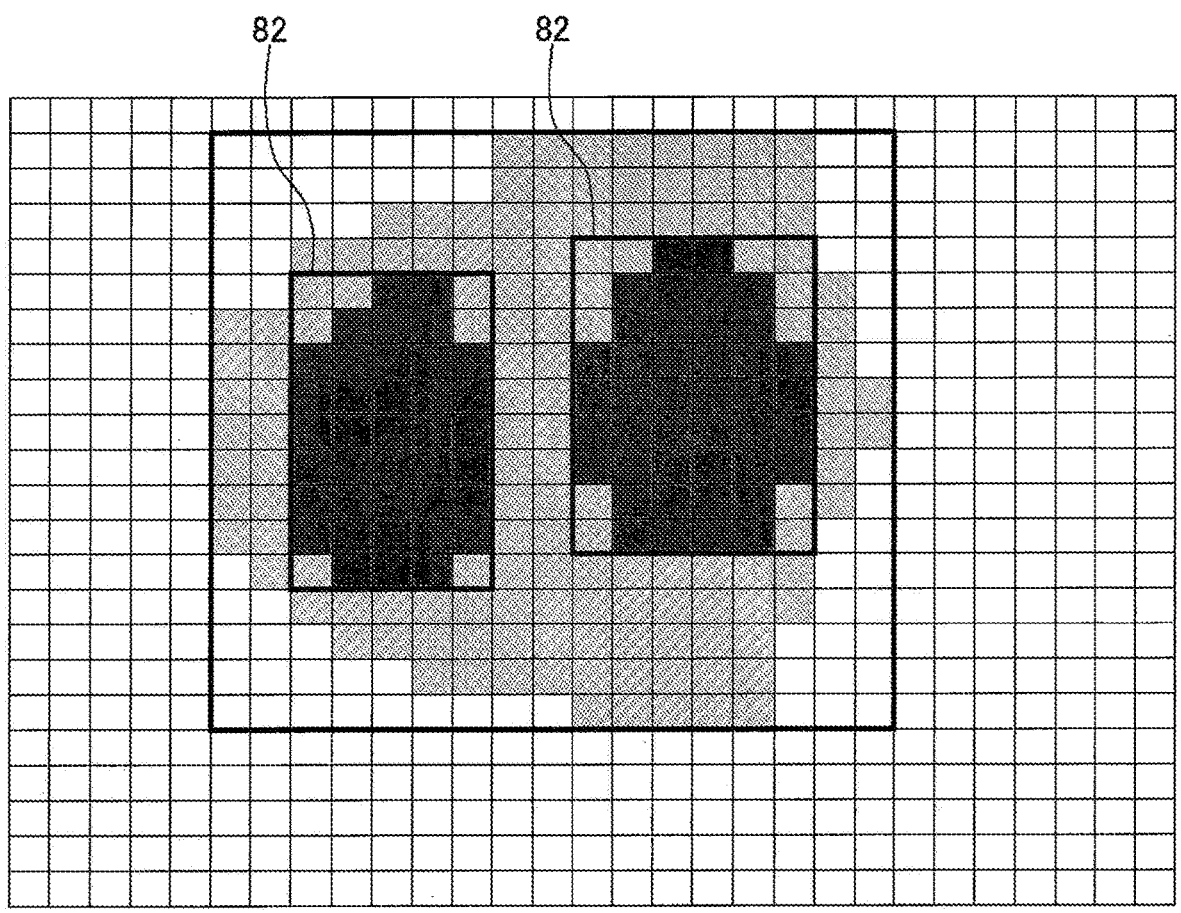
FIG. 15 is a view depicting two second boundary boxes.

FIG. 15 depicts second boundary boxes 82 each of which surrounds a region in which pixels having a luminance equal to or higher than the second luminance continuously appear. In FIG. 15, the second boundary box specification unit 252 specifies two second boundary boxes 82 in the first boundary box 80.

The representative coordinate derivation unit 254 sets a marker region for which a representative coordinate is to be calculated in response to the number of second boundary boxes specified by the second boundary box specification unit 252 (S26). The marker region is a region that defines pixels to be used for calculation of a representative coordinate, and the representative coordinate derivation unit 254 calculates a representative coordinate using pixels in the marker region.

In the case where one second boundary box 82 is specified by the second boundary box specification unit 252 as depicted in FIG. 14, the representative coordinate derivation unit 254 sets the marker region for which calculation of a representative coordinate is to be performed to the first boundary box 80 and derives a representative coordinate of the one marker image on the basis of the pixels in the first boundary box 80. On the other hand, in the case where two or more second boundary boxes 82 are specified by the second boundary box specification unit 252 as depicted in FIG. 15, the representative coordinate derivation unit 254 sets the marker region for which calculation of a representative coordinate is to be performed to the two or more second boundary boxes 82 and derives a representative coordinate of each of the two or more marker images on the basis of the pixels in the second boundary boxes 82.

It is to be noted that, in a case where the second boundary box specification unit 252 does not specify a second boundary box in the first boundary box 80 (N at S24), the first boundary box 80 includes no marker image. Therefore, the first boundary box specification unit 250 discards the first boundary box 80 and returns the processing to S20 to search for a new first boundary body.

After a marker region is set, the representative coordinate derivation unit 254 checks whether or not the marker region includes a marker image on the basis of several criteria. First, the representative coordinate derivation unit 254 checks whether or not a size of the marker region is within a predetermined range (S28). In a case where the marker region is excessively great in size (N at S28), the marker region is not a captured image of a marker 30. Therefore, the first boundary box specification unit 250 or the second boundary box specification unit 252 discards the first boundary box 80 or the second boundary box 82 set as the marker region. The first boundary box specification unit 250 returns the processing to S20 to search for a new first boundary box.

In a case where the size of the marker region is within the predetermined range (Y at S28), the representative coordinate derivation unit 254 checks whether or not a shape of a continuous region of high-luminance pixels included in the marker region is an elongated shape (S30). A captured image of a marker 30 has a round shape and does not have an elongated shape. In a case where the shape of the continuous region of the high-luminance pixels is an elongated shape (Y at S30), since the high-luminance light emitting body included in the marker region is not a marker 30, the first boundary box specification unit 250 or the second boundary box specification unit 252 discards the first boundary box 80 or the second boundary box 82 set as the marker region. The first boundary box specification unit 250 returns the processing to S20 to search for a new first boundary box.

In a case where the shape of the continuous region of the high-luminance pixels is not an elongated shape (N at S30), the representative coordinate derivation unit 254 checks the contrast between the specified marker region and a surrounding region (S32). It is to be noted that, in the case where the marker region is the first boundary box 80, it has been checked at step S22 that the contrast has no problem. Therefore, it is sufficient if the representative coordinate derivation unit 254 calculates, in the case where the marker region is a second boundary box 82, a luminance ratio between the inside and the outside of the second boundary box 82 and compares the luminance ratio with a predetermined value (S32). In a case where the ratio between an average luminance of the pixels in the second boundary box 82 and an average luminance in a predetermined region outside the second boundary box 82 is lower than the predetermined value (N at S32), the second boundary box specification unit 252 discards the second boundary box 82.

In a case where the luminance ratio is equal to or higher than the predetermined value (Y at S32), the representative coordinate derivation unit 254 derives a representative coordinate of the marker image on the basis of pixels having a luminance equal to or higher than a third luminance in the marker region (S34). This representative coordinate may be a gravity center coordinate. The third luminance is lower than the first luminance and is, for example, a luminance value of 46. The representative coordinate derivation unit 254 calculates average luminance positions in an X axis direction and a Y axis direction to derive a representative coordinate (u, v).

In the embodiment, in response to the number of second boundary boxes 82 specified by the second boundary box specification unit 252, the representative coordinate derivation unit 254 derives a representative coordinate of the marker image on the basis of the pixels in the first boundary box 80 or the second boundary box 82. In order to derive a gravity center coordinate of the marker image with high accuracy, it is preferable that the number of pixels to be used for the calculation is large. However, in the case where only one second boundary box 82 exists in the first boundary box 80, by setting the marker region to the first boundary box 80, the representative coordinate derivation unit 254 can derive the gravity center coordinate of the marker image with high accuracy.

The present disclosure has been described in connection with the embodiment. The embodiment is exemplary, and it can be recognized by those skilled in the art that various modifications are possible in regard to combinations of such components, processes, and so forth and that also such modifications fall within the scope of the present disclosure. Although, in the embodiment, the estimation process is performed by the information processing apparatus 10, the functions of the information processing apparatus 10 may be provided in the HMD 100 such that the estimation process is performed by the HMD 100.

While the foregoing description of the embodiment is directed to the arrangement of the plurality of markers 30 in the inputting device 16 that includes the operation members 22, the device that is a target of tracking may not necessarily include the operation members 22. Further, although the foregoing description of the embodiment is directed to the position and posture estimation process in the case where two inputting devices 16 are imaged, the position and posture estimation process is similarly implemented also in the case where three or more tracking-target devices are imaged. Further, although the imaging devices 14 in the embodiment are attached to the HMD 100, it is sufficient if the imaging devices 14 can capture marker images and the imaging devices 14 may be attached to different positions other than the HMD 100.

What is claimed is:

1. An information processing apparatus comprising:
   a captured image acquisition unit configured to acquire an image captured by imaging a device that includes a plurality of markers; and
   an estimation processing unit configured to estimate position information and posture information of the device on a basis of marker images in the captured image, wherein
   the estimation processing unit includes
   a marker image coordinate specification unit configured to specify a representative coordinate of each of the marker images from the captured image, and
   a position and posture derivation unit configured to derive the position information and the posture information of the device using the representative coordinates of the marker images, and wherein
   the marker image coordinate specification unit includes
   a first boundary box specification unit configured to specify a first boundary box surrounding a region within which pixels having a luminance equal to or higher than a first luminance continuously appear,
   a second boundary box specification unit configured to specify at least one second boundary box surrounding a region within which pixels having a luminance equal to or higher than a second luminance continuously appear in the first boundary box, the second luminance being higher than the first luminance,
   wherein the at least one second boundary box is contained within the first boundary box, and
   a representative coordinate derivation unit configured to derive the representative coordinate of each of the marker images on a basis of pixels in the first boundary box or the second boundary box in response to the number of second boundary boxes specified by the second boundary box specification unit.

2. The information processing apparatus according to claim 1, wherein the representative coordinate derivation unit derives the representative coordinate of each of the marker images on a basis of pixels having a luminance equal to or higher than a third luminance within the first boundary box or the at least one second boundary box.

3. The information processing apparatus according to claim 1, wherein the representative coordinate is a gravity center coordinate.

4. The information processing apparatus according to claim 1, wherein, where the second boundary box specification unit specifies only the at least one second boundary box, the representative coordinate derivation unit derives a representative coordinate of one marker image on a basis of pixels in the first boundary box, and
   where the second boundary box specification unit specifies two or more second boundary boxes, the representative coordinate derivation unit derives representative coordinates of two or more marker images on a basis of pixels in the second boundary boxes.

5. The information processing apparatus according to claim 1, wherein, where a ratio between an average luminance in the first boundary box and an average luminance in a predetermined region on an outside of the first boundary box is lower than a predetermined value, the first boundary box specification unit discards the first boundary box.

6. The information processing apparatus according to claim 1, wherein, where a ratio between an average luminance in the second boundary box and an average luminance in a predetermined region on an outside of the at least one second boundary box is lower than a predetermined value, the second boundary box specification unit discards the second boundary box.

7. A representative coordinate derivation method for deriving a representative coordinate of a marker image included in a captured image, comprising:
   specifying a first boundary box surrounding a region within which pixels having a luminance equal to or higher than a first luminance continuously appear;
   specifying a second boundary box surrounding a region within which pixels having a luminance equal to or higher than a second luminance continuously appear in the first boundary box, the second luminance being higher than the first luminance,
   wherein the second boundary box is contained within the first boundary box; and
   deriving the representative coordinate of the marker image on a basis of pixels in the first boundary box or the second boundary box in response to the number of specified second boundary boxes.

8. A non-transitory computer readable medium having stored thereon a program for a computer, performing a process, comprising:
   specifying a first boundary box surrounding a region within which pixels having a luminance equal to or higher than a first luminance continuously appear in a captured image;
   specifying a second boundary box surrounding a region within which pixels having a luminance equal to or higher than a second luminance continuously appear in the first boundary box, the second luminance being higher than the first luminance,
   wherein the second boundary box is contained within the first boundary box; and deriving a representative coordinate of a marker image on a basis of pixels in the first boundary box or the second boundary box in response to the number of specified second boundary boxes.

\* \* \* \* \*